（12）United States Patent
Ponnapur et al.

(10) Patent No.: US 7,917,617 B1
(45) Date of Patent: Mar. 29, 2011

(54) MITIGATING REBASELINING OF A VIRTUAL MACHINE (VM)

(75) Inventors: Anton Kumar Ponnapur, Karnataka (IN); Anurag Palsule, Karnataka (IN)

(73) Assignee: NetApp, Inc., Sunnyvale, CA (US)

( * ) Notice: Subject to any disclaimer, the term of this patent is extended or adjusted under 35 U.S.C. 154(b) by 257 days.

(21) Appl. No.: 12/191,747

(22) Filed: Aug. 14, 2008

(51) Int. Cl.
G06F 15/16 (2006.01)
(52) U.S. Cl. .................................. 709/224; 711/6; 718/1
(58) Field of Classification Search .................. 709/224, 709/226; 711/6; 718/1
See application file for complete search history.

(56) References Cited

U.S. PATENT DOCUMENTS

| 2007/0204265 A1* | 8/2007 | Oshins ............................ 718/1 |
| 2007/0208918 A1* | 9/2007 | Harbin et al. ................ 711/162 |
| 2009/0182928 A1* | 7/2009 | Becker et al. .................... 711/6 |

* cited by examiner

Primary Examiner — David Lazaro
(74) Attorney, Agent, or Firm — Cooper Legal Group, LLC (57) ABSTRACT

A virtual machine can be migrated from a first physical server to a second physical server. Rebaselining of the virtual machine after migration can be mitigated, thereby mitigating recopying of the virtual machine's data to a second location on a backup data store, for example. A unique identifier for the virtual machine is used to determine if it has been migrated to another physical server. If a migration is detected, it is determined whether the virtual machine had a data store backup relationship prior to the migration. If a prior data backup relationship is detected, this prior relationship is used for the virtual machine at its migrated location on the second physical server for subsequent data backups. Conformance testing is used to mitigate multiple data backups of the VM, comprising data backups to a data store for both the first and second VM hosting servers.

18 Claims, 7 Drawing Sheets

MITIGATING REBASELINING OF A VIRTUAL MACHINE (VM)

BACKGROUND

In a computing environment, virtual machines may be used to concurrently run two or more different operating systems on a single physical computer system, for example, to isolate test and beta versions of computer program modules, without affecting other systems on a computer system. Further, virtual machines may be used to separate storage on a computer system, in order to create isolated storage systems. Physical servers, for example, used in a storage system can be consolidated as virtual servers in the form of Virtual Machines located on one or more physical servers. A cluster of servers comprising virtual servers may be linked to a data store that can be used to back up data from the plurality of virtual servers.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A plurality of virtual machines (VMs) can be installed on one or more physical machines, for example, to maintain different operating systems, run beta tests on programming, or to maintain separate servers on a limited physical system. As an example, a data storage manager may wish to consolidate data management and storage servers as virtual servers on physical servers in an enterprise storage system, so that individual virtual servers are relatively isolated from each other. In this example, in certain situations an enterprise may wish to isolate storage from various groups or functions, but the storage needs of the individual groups or functions may not require an entire server. In these situations, a virtual server instantiated on a physical server may be appropriate. Typically, in this example, enterprise data storage and management systems comprise a data backup component, that may be used to backup the data from the plurality of VMs on the system.

In the situation where virtual machines are scheduled to be backed up to a data store on a routine basis, a data backup relationship may be established for the respective VMs on the system. The data backup relationship can be a location in the data store assigned to a particular VM on a particular physical server, for example. Further, data storage and management systems can allow for VMs to be migrated from one physical server to another in the system, for example, when one server becomes overloaded (e.g., to balance the load), or a server goes down. Currently, as an example, when a VM is migrated from a first physical server to a second physical server a new data backup relationship with the data store is created for the VM on the second server, and the previous backup relationship is deleted. In this example, when the new data backup relationship is created the VM needs to be rebaselined for the data backup, by copying the data from the VM to its new location on the data store. Recopying of an entire VM can be computationally expensive, requiring time and computing resources.

Techniques and systems are disclosed herein for mitigating rebaselining of a virtual machine when migrating the virtual machine from a first server to a second server. The techniques and systems comprise, among other things, using a unique identifier (e.g., a Universally Unique Identifier (UUID)) for the VM to determine if it has been migrated to another physical server. For example, system directories may be monitored to determine which server (s) the VM is associated with. If a migration is detected, it can be determined whether the VM had a data store backup relationship prior to the migration. As an example, the system directories can also be used to identify potential data backup relationships associated with the VM. If a prior data backup relationship is detected, this prior relationship can be used for subsequent data backup of the VM at its location on the second physical server. Using the prior relationship with the data store can, for example, mitigate a need for rebaselining and copying of the VM to another location in the data store. In this example, because the prior relationship with the data store can be used for subsequent VM data backups, a new relationship with the data store may not need to be created, and rebaselining (e.g., recopying) all of the VM's data to the new relationship location may not be necessary. Conformance testing can be used to mitigate multiple data backups of the VM, for example, by using conformance errors that show multiple locations and/or data backup relationships for the VM in the system directories.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Embodiments described herein relate to techniques and systems for mitigating rebaselining of a virtual machine when migrating the virtual machine from a first server to a second server.

Figure 1:
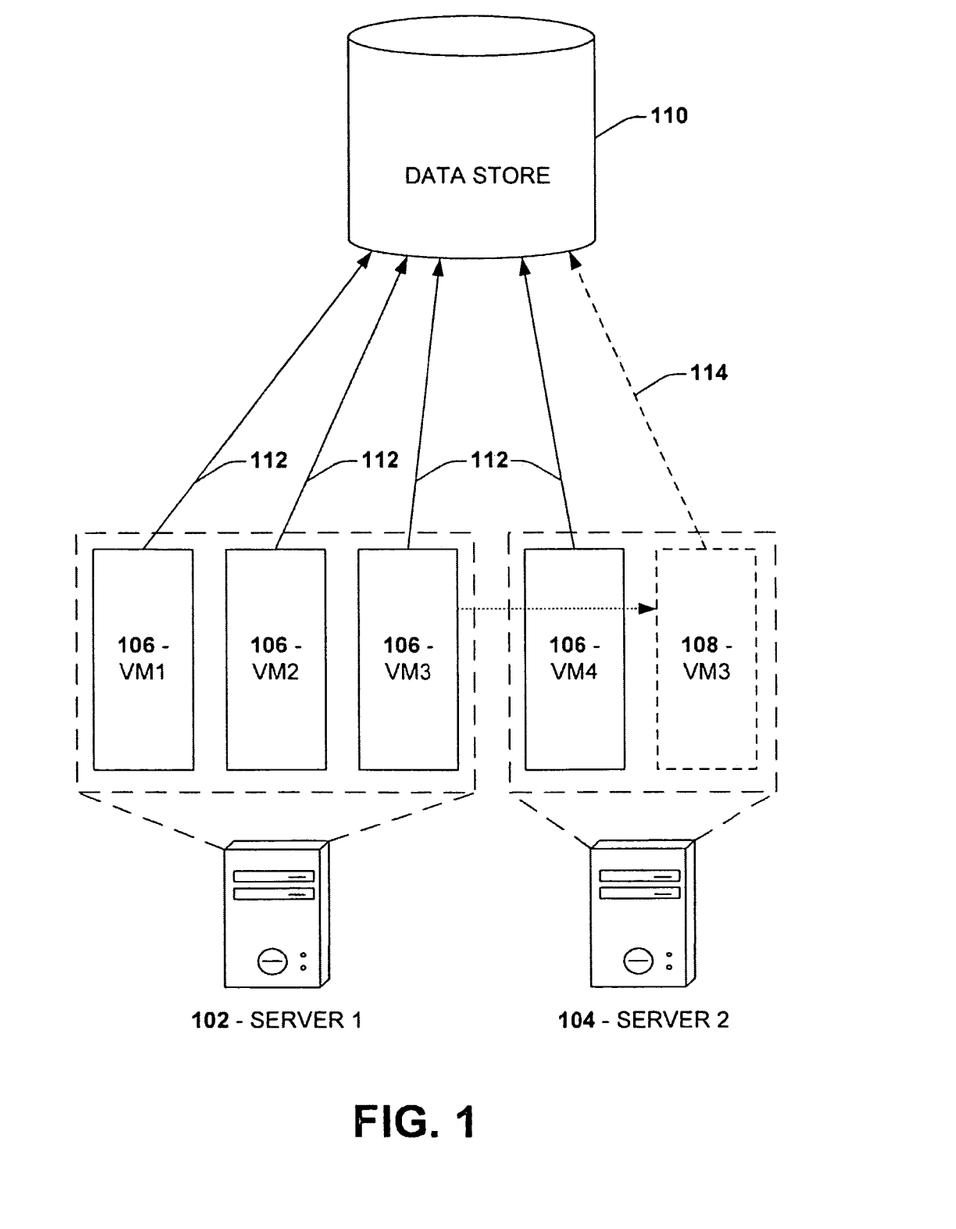
FIG. 1 is an illustration of one embodiment of a virtual machine environment.

FIG. 1 is an illustration of one embodiment 100 of a virtual machine (VM) environment. In this embodiment 100 two physical machines, server one 102 and server two 104, may contain one or more instantiations of a VM 106. VMs, for example, may allow multiplexing of the underlying physical machine. Two or more VMs may be installed on a computer system, for example, in order to isolate software modules or operating systems, or to consolidate storage servers in an enterprise storage system. In this example, a data storage manager may instantiate storage servers as VMs (e.g., virtual servers) on physical servers in an enterprise storage system, so that individual VMs are relatively isolated from each other.

In this embodiment 100, server one 102 has three VMs 106 (VM1, VM2, and VM3) installed thereon, and server two 104 has one VM 106 (VM4) installed thereon. In this example, the VMs may be installed upon a virtual machine monitor (not pictured) (e.g., VMware on a ESX server) that can be installed directly on the native hardware (e.g., 'bare metal' installation) of the servers 102 and 104; however, hypervisors may also be installed as a software layer in a native operating system, known as a host operating system. Virtual machine monitors can manage virtualization of the underlying physical machine.

In this embodiment 100 the respective virtual machines 106 can comprise storage or data management servers used for various functions or groups within an enterprise. Often, enterprise storage and data management systems comprise a data store 110, for example, which can be used to backup data from the various servers in the system. In this embodiment, the data store 110 can be used to backup data from the virtual servers 106 installed on the physical servers 102 and 104. In this example, respective virtual servers 106 may have a backup relationship 112 with the data store 110, which can be used for the backing up the respective VMs 106 to a specified location in the data store 110.

As an example, a data storage and management system may comprise a system management program that can monitor data traffic and resources for the system. In this example, the system management program may detect that a particular physical server is running at an 'overload' (e.g., as determined by a preset limit for server traffic), and may wish to migrate one or more of the virtual servers from the 'overloaded' server to another physical server with less traffic.

In the embodiment 100, VM3 106 may be migrated from server one 102 to server two 104, at 108, for example, to reduce an overload on server one 102. In this example, because VM3 108 is now located on server two 104, a new backup relationship 114 may need to be established that specifies a location in the data store 110 for the VM3 108 to be backed up. However, in this example, a previous backup relationship 112 existed for VM3 106 when it was located on server two 102. Current techniques can require that VM3 108 be rebaselined, and VM3's data be recopied to a new location in the data store 110, corresponding to the new backup relationship 114.

Figure 2:
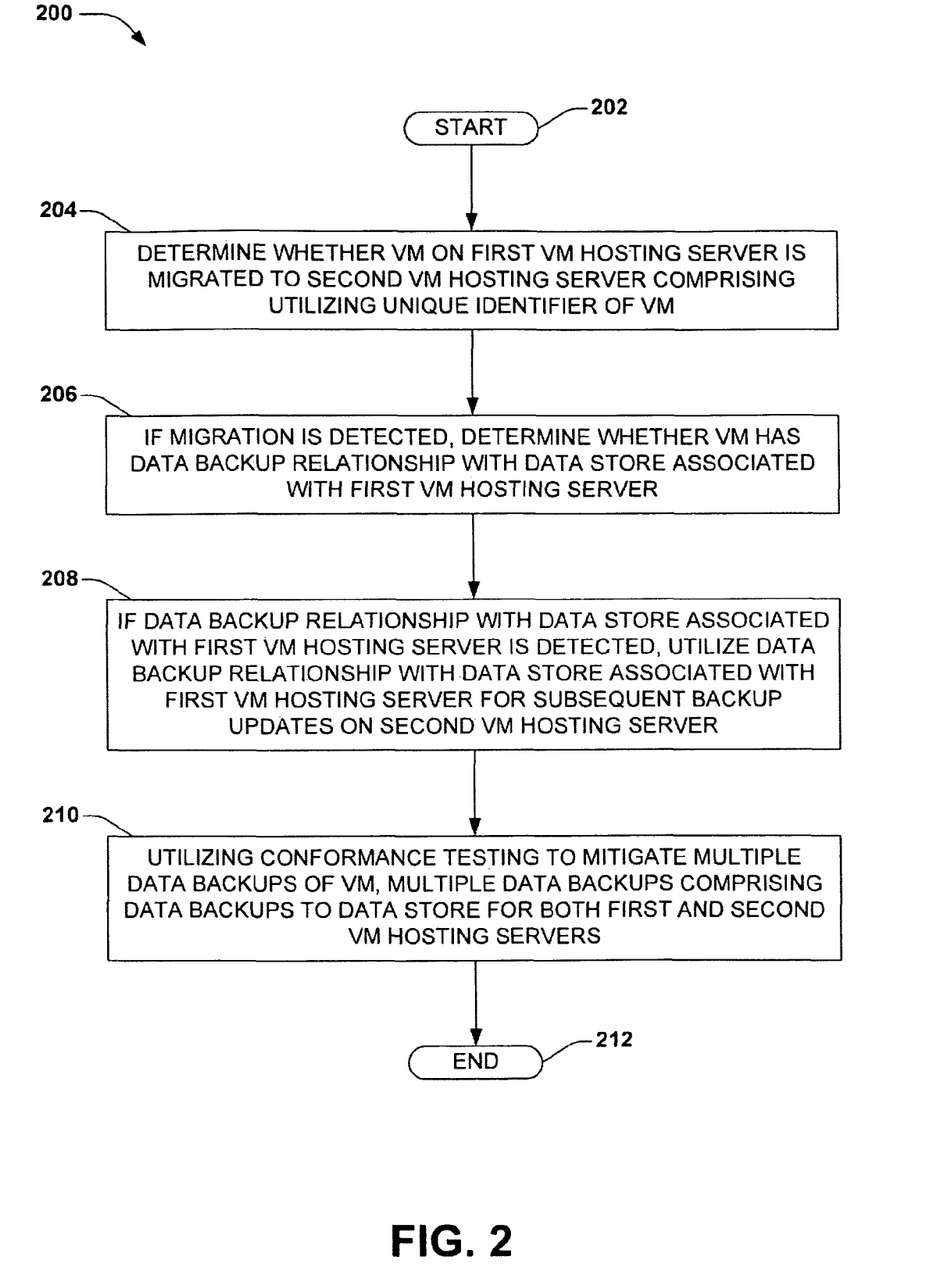
FIG. 2 is a flow diagram of an exemplary method for mitigating rebaselining of a virtual machine when migrating the VM from a first server to a second server.

FIG. 2 is a flow diagram of an exemplary method 200 for mitigating rebaselining of a virtual machine (VM), having a backup relationship with a first VM hosting server and a unique identifier, when migrating the VM from a first server to a second server. The exemplary method 200 begins at 202 and involves determining whether the VM on the first hosting server is migrated to a second VM hosting server using the unique identifier for the VM, at 204. As an example, respective VMs can have an identifier such as a Universally Unique Identifier (UUID) associated with them that unique to the respective VMs. In this example, this UUID can be traced by a system manager (e.g., by looking in server directories that contain VMs hosted on respective servers) to identify where respective VMs may be located in a system comprising a cluster of servers.

In the exemplary method 200, at 206, if the migration of the VM is detected, it is determined whether the VM has a data backup relationship with a data store that's associated with the first VM hosting server. For example, prior to the VM being migrated over to the second server, the VM may have had a data backup relationship with the data store when the VM was located on the first server. In this example, the unique identifier (e.g., UUID) may be used to identify the VM's data backup relationships in backup directories located on respective servers in the system. A data backup agent may monitor these directories, for example, and report appropriate information to the system manager, which can be used to determine data backup relationships with respective VMs on the servers in the system.

In the exemplary method 200, at 208, if a data backup relationship is detected, as described above, the data backup relationship with the data store associated with the first VM hosting server is used for subsequent backup updates of the VM on the second VM hosting server. As an example, instead of creating a new backup relationship with the data store for the VM as located on the second server, and requiring that the VM be rebaselined (e.g., all of the VM's data being recopied to the new location in the data store) one or more backup directories can be updated to associate the VM's location on the second server with the VM's previous backup relationship location in the data store. In this way, for example, the one or more locations in the data store that were previously used to backup the VM when it was located on the first server can be used to backup the VM as located on the second server, thereby mitigating rebaselining the VM at a new data store location. Utilizing the previous backup relationship can, for example, mitigate a need to rebaseline the VM, which may mitigate a need to copy the VM's data to another location in the data store.

At 210, of the exemplary method 200, conformance testing is used to mitigate multiple data backups of the VM, the multiple data backups comprising data backups to the data store for both the first and second VM hosting servers. As an example, if a data backup relationship exists for the VM at both the first and second servers, when a backup is scheduled the system may attempt to backup the VM from both locations. In this example, conformance testing of the server system may be utilized, which can generate conformance errors. Conformance errors can identify potential problems, such as multiple location backups, and the system manager can use these conformance errors to attempt to mitigate these potential problems before they occur, for example.

Having performed conformance testing to mitigate multiple data backups, the exemplary method 200 ends at 212.

Figure 3:
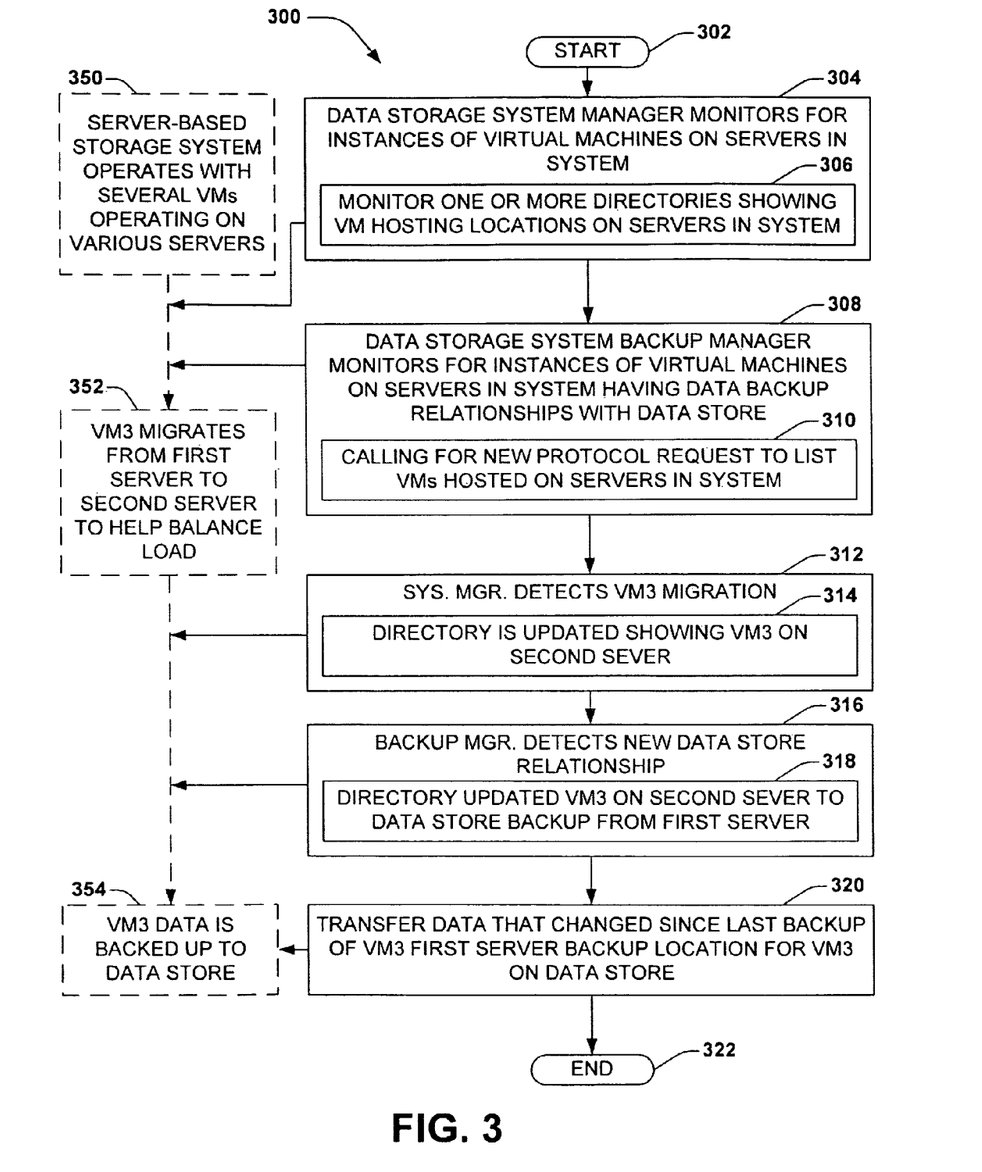
FIG. 3 illustrates one embodiment of techniques for mitigating rebaselining of a virtual machine (VM) when migrating the VM from a first server to a second server.

FIG. 3 illustrates one embodiment 300 of the techniques for mitigating rebaselining of a virtual machine (VM) when migrating the VM from a first server to a second server. At 350, an example server-based storage system is operating with several virtual machines (e.g., virtual servers) instantiated on two or more physical servers. At 304 in the exemplary embodiment 300, a data storage system manager monitors for instances of virtual machines on servers in the system. In this embodiment, at 306, the data storage system manager can monitor one or more directories in the system that shows locations of the VMs on the physical servers of the system. For example, a directory may comprise a list of VMs using their respective UUIDs, and a corresponding list of server locations for the respective VMs. In this example, when a system management agent updates the directory after a VM is migrated to another physical server, the data storage system manager can detect the migration.

At 308 in the exemplary embodiment 300, a data storage system backup manager monitors for instances of VMs on physical servers in the system that have a data backup relationship with a data store. In this embodiment, at 310, the data storage system backup manager can call for a new protocol request (e.g., a Network Data Management Protocol (NDMP) request, used to transport data between servers) to list VMs hosted on the various servers in the system. As an example, the data storage system backup manager can call to respective servers in the systems to respond to the request with a list from a directory that shows the VMs on that physical server, along with the associated data backup relationships with the data store. In this way, if a VM migration occurs and is detected by the data storage system manager, the data storage system backup manager can call for the directories of backup relationships to determine if the migrated VM had a backup relationship with the data store from the first server, before being migrated to the second server.

At 352, for example, a server in the data storage and management system may become overloaded and request a balancing of VMs across the system. In this example, VM3 migrates from a first physical server in the system to a second physical server in the system, in response to the requested balancing. In the exemplary embodiment 300, at 312, the system manager detects the migration of VM3 from the first physical server to the second physical server, for example, by detecting a change in the VM location directories, as described above. In this embodiment, at 314, the directory that lists the locations of VMs on the physical servers in the system is updated, for example, by an updating agent to reflect VM3's new location on the second server.

At 316, the backup manager detects a new data store relationship may be needed for VM3 on the second server, for example, in order to backup VM3's data at its new location on the second server. In this embodiment, at 318, the one or more backup directories are updated, for example, by an updating agent, so that the backup relationship for VM3 on the second server points to the one or more backup locations on the data store that were associated with VM3 when it was on the first server. In this way, for example, a new backup location may not be needed to be created on the data store, and a rebaselining of VM3 may not be necessary, thereby mitigating a need to recopy all of VM3's data to the data store.

At 354, for example, VM3's data is backed up to the data store at a scheduled backup time for the storage system. In this example, because the data backup relationship has been updated for VM3, the data is backed up to the one or more data store locations that were previously used when VM3 was located on the first server. At 320, in exemplary embodiment 300, during the backup, merely the data (e.g., data blocks) that have changed since a last previous backup, for example, of VM3, are transferred to the data store. As an example, VM3 may have been backed up to the data store prior to being migrated to the second server. When the subsequent backup of VM3 occurs, in this example, when it is located on the second server, only those blocks of data that have changed between the previous backup and the current backup will be transferred to the data store instead of all of the VM's data.

Figure 4:
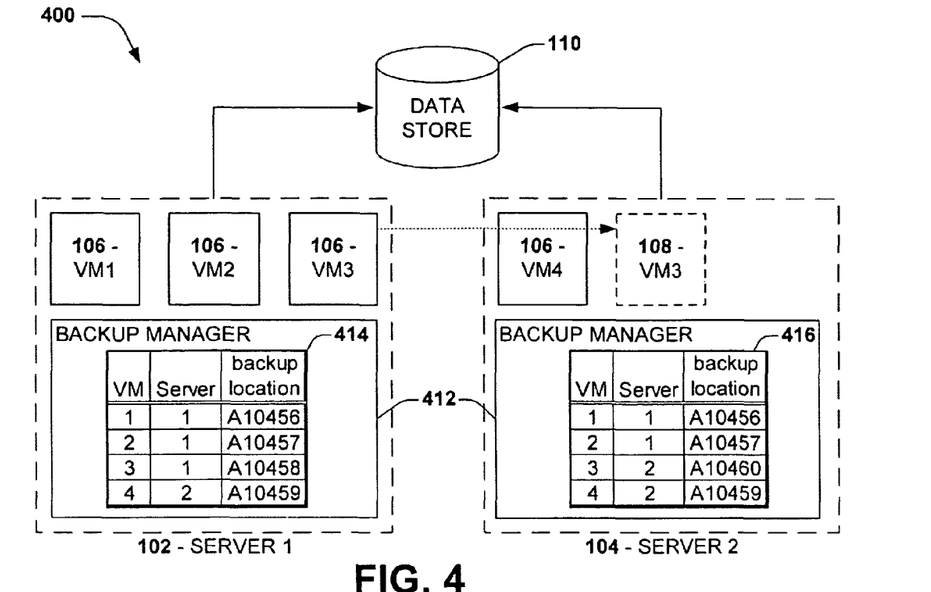
FIG. 4 is an illustration of one exemplary embodiment of a server-based data storage and management system using directories.

In one aspect, as described above, information concerning location of a virtual machine (VM) and a backup relationship between a VM and the data store can be stored in directories in the system. FIG. 4 is an illustration of one exemplary embodiment 400 of a server-based data storage and management system (e.g., as in FIG. 1) using directories. In the exemplary embodiment 400, two physical servers 102 and 104 are in contact with a data store 110 that can be used to backup data from the servers 102 and 104. Server one 102 comprises three installed VMs 106, which can, for example, be used as virtual servers in the server system. In this example, server one 102 also comprises a backup manager 412, which can be used to manage the backup of VMs 106 to the data store 110. The backup manager 412 may contain and manage a backup directory 414, which lists respective VMs in the system, a corresponding server that is hosting the respective VMs, and a corresponding backup location to the data store 110 for the respective VMs.

In the exemplary embodiment 400, VM3, at 106, may be migrated from server one 102 to server two 104, for example, in an attempt to balance the system. In this example, when VM3, at 108, is migrated to server two 104 the backup directory 416 in the backup manager 412 of server two 104 can be updated by a backup agent to reflect VM3's 108 new location in server two 104. Further, because VM3 108 is a new instance of a VM on server two 104, a new data backup location may be created in the backup directory 416 for VM3 108. However, for example, a potential conflict may arise when VM3 is scheduled for a backup to the data store 110. The backup directory 414 in server one 102 shows a different server location and data backup location than the backup directory 416 in server two 104.

Figure 5:
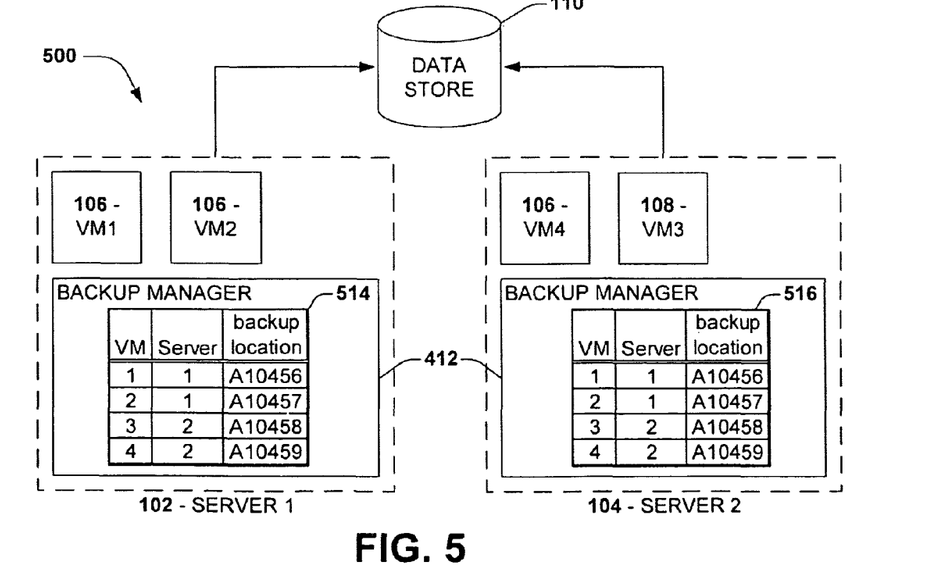
FIG. 5 is an illustration of another exemplary embodiment of a server-based data storage and management system using directories.

In the exemplary embodiment 500 of FIG. 5, the potential conflict can be resolved by updating both directories 514 and 516 to reflect VM3's 108 location in server two 104, and VM3's backup relationship to the data store 110 referring to the location used by VM3 106 when it was located on server one 102 (A10458). In this example, a backup agent can be used in conjunction with a system manager to discover actual locations of VMs on physical servers in the system, and to migrate the VM's pre-migration backup relationship to its new location. In this way, for example, because it may not be necessary to create new data backup relationship with the data store for the VM at its new location, the VM may not need to be rebaselined (e.g., all of the VM's data being recopied to the new location in the data store), mitigating a need to recopy the VM to a new location in the data store.

It will be appreciated that, while the exemplary embodiments utilize a directory managed by a backup manager located on respective servers in a server system, the techniques and systems, described herein, are not limited to these embodiments. In another embodiment, for example, a backup manager may be installed on respective physical servers, which can report instances of VMs on respective servers to a system management interface. In this embodiment, the backup manger on respective servers may only backup those VMs that are registered to it. A system backup directory monitor may discover the VMs that can be backed up, by monitoring the backup manager directories on respective servers. Further, for example, the system management interface can poll new requests by the backup manager to list VMs hosted on the respective servers. In this embodiment, if the data store is shared between multiple servers, and a VM is migrated from one physical server to another, the system manager can detect the migration by monitoring the directories. Additionally, for example, the management interface can determine if more than one backup relationship exists, using the directories, and facilitate moving the old backup relationship to the new location.

In another aspect, conformance testing may be needed to mitigate virtual machine (VM) data backup conflicts. As described above (FIG. 4, 400), there may be situations where multiple instances of a same VM can be reported by different backup managers that have access to a data store hosting the VM's data backup. In this aspect, in one embodiment, the system manager can discover respective instances of VM reported by the backup manager by monitoring the directories for respective backup managers. In this embodiment, for example, respective instances can be directory objects having a same unique identified (e.g., UUID). In this example, respective instances of the VM can have their own object ID in the system manager's database (directory).

In one embodiment, for example, in order to mitigate the VM being backed up to multiple locations, the system management interface can perform conformance testing. In this embodiment, conformance testing of the VM data backup relationships in the system can produce conformance errors, which may be used to resolve potential multiple backup conflicts. As an example, when an instance of a VM is added to a dataset (e.g., directory), and if the same VM (e.g., having a same object ID) is a member of another data set, a conformance error can be thrown and any resulting backup fails until the conflict is resolved. Further, in this example, if a physical server is added to a dataset, and one of the VMs hosted on the server is a member of another dataset, a conformance error is thrown and the operation fails until the conflict is resolved. However, in this example, if a VM is added to a dataset and it is not a member of any other dataset in the system, a conformance error may not be thrown and the operation may proceed.

In this aspect, in one embodiment, a conformance tester can check to see if a particular VM has already been backed up from another physical server (e.g., have a backup relationship from an instance on a server), before proceeding with a current VM backup on its current physical server. As an example, if the conformance tester determines that the VM has already been backed up from another physical server, but determines that the backup relationship is the same as the previous backup, a conformance error may not be thrown, as the relationship has been migrated to the VM's new location. On the other hand, in this example, if the conformance testing determines that the backup relationship is different than the previous backup, a conformance error can be thrown, and the backup can be stopped until the conflict is resolves. In this way, the conformance testing may be used to mitigate the VM from being backed up to multiple locations in the data store.

Figure 6:
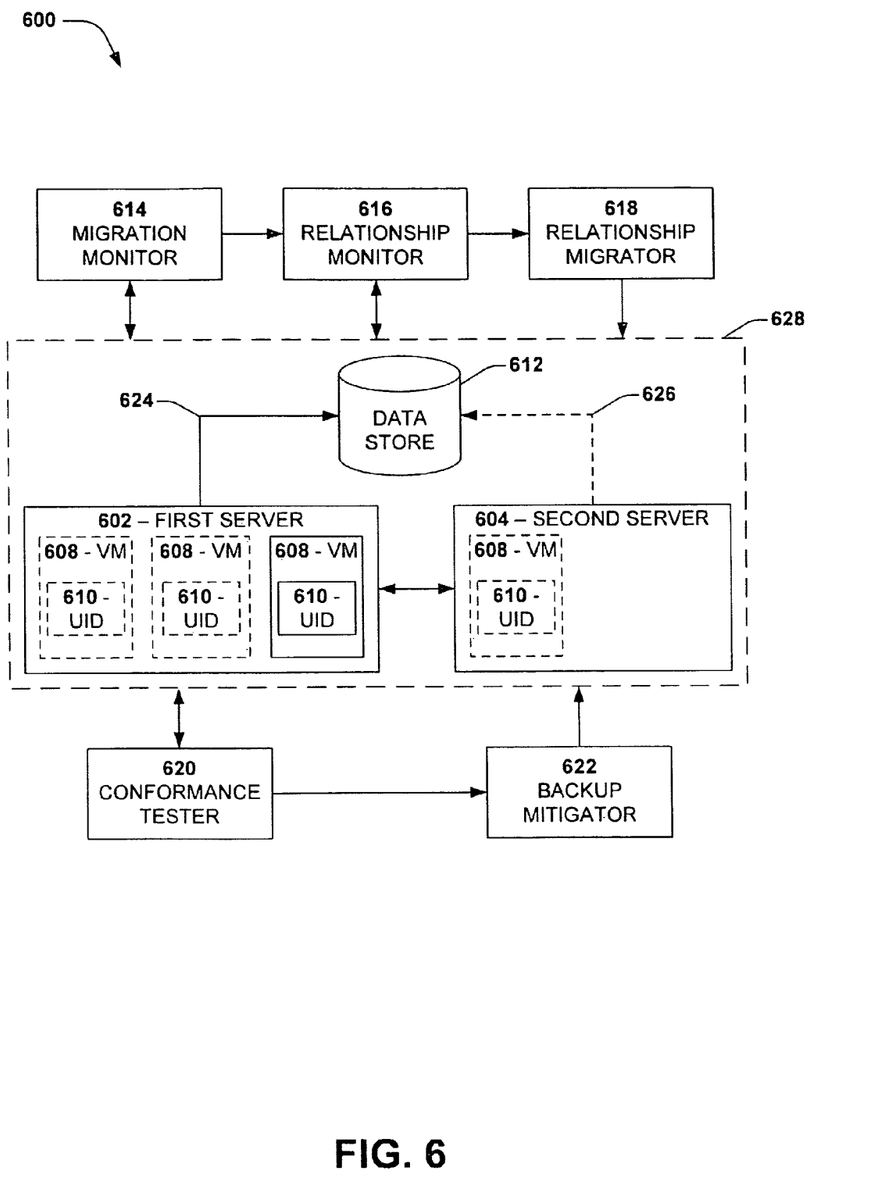
FIG. 6 is a component block diagram of an exemplary system for mitigating rebaselining of a virtual machine (VM) when migrating the VM from a first VM hosting server to a second VM hosting server.

A system may be devised for mitigating rebaselining of a virtual machine (VM) when migrating the VM from a first VM hosting server to a second VM hosting server. FIG. 6 is a component block diagram of an exemplary system 600 for mitigating rebaselining of a virtual machine (VM) when migrating the VM from a first VM hosting server to a second VM hosting server. The exemplary system 600 comprises a first server 602 and a second server 604, which can both be configured to host a VM 608. As an example, an enterprise data storage and management system may comprise multiple virtual servers that have been consolidated and installed as virtual machines 608 on multiple physical servers 602 and 604.

The exemplary system 600 further comprises a VM 608, which is associated with a unique identifier 610 (e.g., a Universally Unique Identifier (UUID)). In this way, for example, respective VMs 608 in the system can be managed and identified individually by their unique identifiers 610. Further, the exemplary system 600 comprises a data backup component 612 (e.g., a data store), which can be operably coupled to the first 602 and second 604 servers, and may be configured to backup the respective VMs 608 in the system. As an example, virtual servers used in the enterprise data storage and management system may contain enterprise files and other important data. In this example, data from respective virtual servers can be backed up to a data store at scheduled intervals.

The exemplary system 600 further comprises a VM migration monitor 614, which can be configured to detect whether a VM 608 is migrated from one physical server 602 to another 604 in the server system 628, utilizing the unique identifier 610 of the VM 608. As an example, as described above (FIG. 2, 204), a system manager can monitor a system directory that comprises a list of VMs and respective corresponding physical servers on which the VMs are hosted. In this example, the directory can contain a UUID 610 for the respective VMs corresponding to its server location. The system manager can monitor when a VM's server location changes in the directory, for example, when a management agent updates the directory.

The exemplary system 600 further comprises a VM data backup relationship detector 616, which can be configured to detect a relationship between the VM 608 and the data backup component 612. As an example, the relationship detector 616 may receive notice from the migration monitor 614 that a VM has been migrated to another physical server, and acting on this information, can identify the data store 612 backup relationship for the VM 608 by searching backup directories of respective physical servers.

The exemplary system 600 further comprises a data backup relationship migration component 618, which can be configured to migrate the data backup relationship of a VM 608 to the VM's new server location. As an example, the relationship detector 616 can notify the relationship migrator 618 that a data backup relationship already exists for the VM 608 that has been migrated to another physical server. In this example, acting on the notice, the relationship migrator 618 can update the backup directory in the VM's new server 604 to reflect the data backup relationship that the VM 608 used when it was located on the previous server 602.

The exemplary system 600 further comprises a conformance tester 620, which can be configured to generate conformance errors for the VM 608 subsequent to VM migration to the second server 604; and a data backup mitigation component 622, which can be configured to utilize the conformance errors to mitigate instances of multiple data backup of the VM 608 from both servers 602 and 604. In one embodiment, for example, these components 620 and 622 can work together to mitigate multiple instances of data backup relationships for a same VM 608. In this example, when a VM 608 is scheduled for a data backup the conformance tester 620 may review directories in the system to determine whether the VM is associated with another physical server or backup relationship, using the VM's UUID 610. If multiple instances are identified, a conformance error can be thrown by the conformance tester 620, for example. The data backup mitigation component 622 can use the errors to stop the current operation and, in this example, update respective directories to reflect an appropriate single instance of the VM's location and/or data backup relationship.

Figure 7:
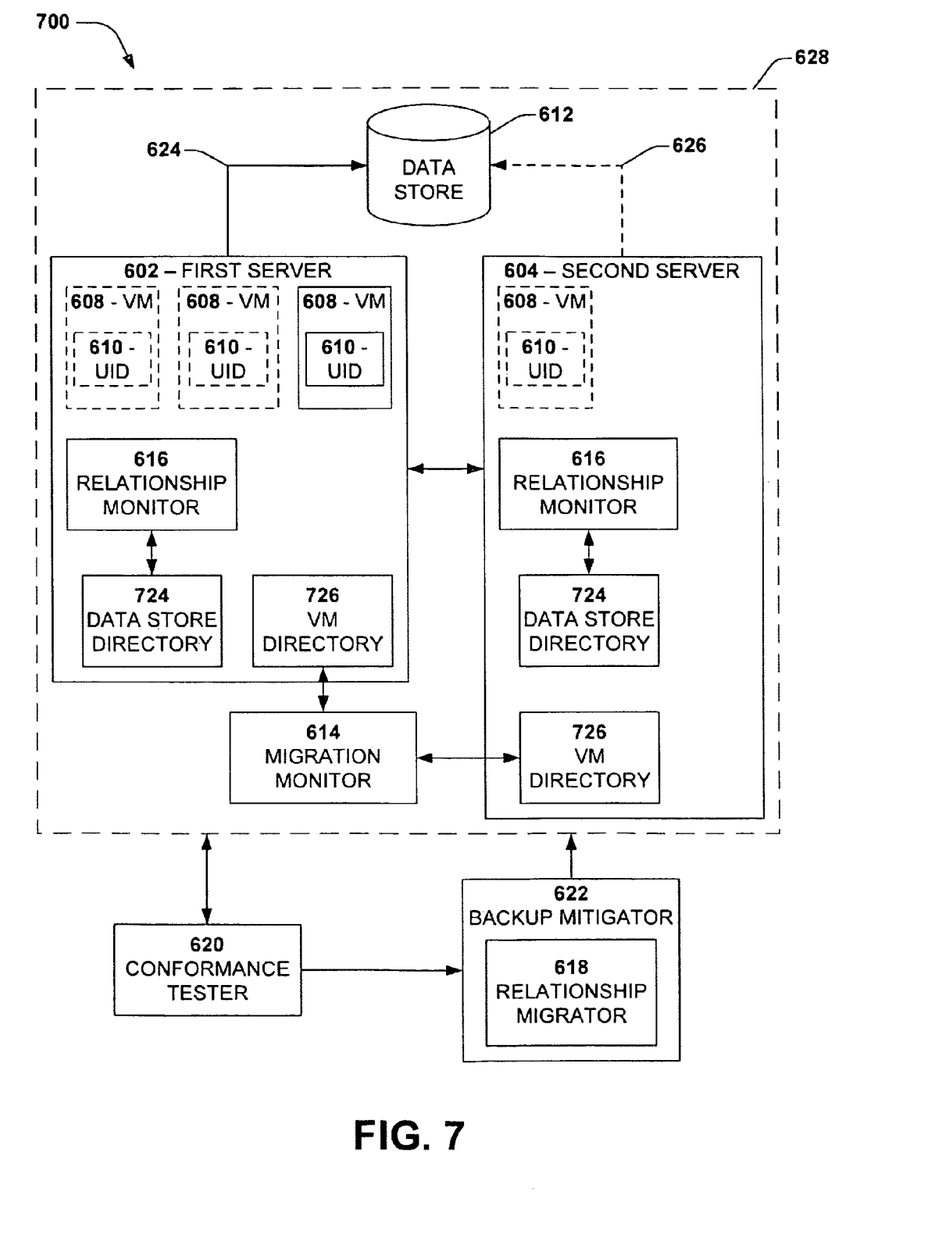
FIG. 7 is a component block diagram of one exemplary embodiment of an exemplary system for mitigating rebaselining of a virtual machine (VM) when migrating the VM from a first VM hosting server to a second VM hosting server.

FIG. 7 is a component block diagram of one exemplary embodiment 700 of the exemplary system 600, described above. In the exemplary embodiment 700, the first and second servers 602 and 604 respectively comprise one or VMs 608, with respective UIDs 610, and a data backup relationship detector 616. Further, in this exemplary embodiment 700, a physical server system 628 comprises a data store 612, having backup relationships 624 and 626 with physical servers 602 and 604. Additionally, the physical server system 628 comprises a VM migration monitor 614 to detect when a VM is migrated from one physical server to another.

In the exemplary embodiment 700, the first and second servers 602 and 604 respectively comprise a data store backup directory 724, which can comprise a list of VMs 608 located on the respective physical servers 602 and 604, and corresponding backup relationships with the data store 612. Further, in this embodiment, the first and second servers 602 and 604 respectively comprise a VM location directory 726, which can comprise a list of VMs and the corresponding physical servers 602 and 604 on which they are being hosted.

In this embodiment, for example, the migration monitor 614 can monitor the respective VM location directories 726 to determine the location of respective VMs. Additionally, in this example, if a system management agent updates the respective directories 726 to reflect a recent migration of a VM 608 from the first server 602 to the second server 604, the VM migration monitor can detect the migration.

Further, in this embodiment, the data store backup relationship detector 616 can monitor the data store backup directory 724 to determine if a relationship with the data store 612 exists for respective VM instances on the server. In this way, for example, if the migration monitor 614 detects a migration of a VM 608 the relationship detector 616 can determine if a pre-migration data backup relationship exists.

In the exemplary embodiment 700, prior to a backup operation, the conformance tester 620 can review information found in the respective directories, as described above, and generate conformance errors for use by the data backup mitigation component 622. In this example, the data backup mitigation component 622 can suspend the pending operation until potential conflicts are resolved. In this embodiment, the data backup relationship migration component 618 can be comprised within the data backup mitigation component 622, and used to resolve potential data backup conflicts, for example, by updating respective data store directories 724 to reflect the pre-migration data backup relationship for the VM 608.

It will be appreciated that, while the exemplary systems shown in FIGS. 6 and 7 illustrate system components located in specific locations, the system described herein is not limited to having these components at the illustrated positions. For example, a system may be configured that comprises multiple physical servers comprising a plurality of VMs, and a data backup component (e.g., a data store). In this example, respective servers may comprise instances of a data backup manger, which comprises one or more data sets (e.g., directories) describing VM backup relationships and locations. Further, in one embodiment, the system may comprise a system manager that comprises one or more data sets for respective VMs and physical servers. In these embodiments, the components in the exemplary system may be located on respective physical servers and/or in the system manager.

Computer programming may be configured to mitigate rebaselining of a virtual machine (VM), having a backup relationship with a first VM hosting server and a unique identifier, when migrating the VM from the first VM hosting server to a second VM hosting server. The computer programming may be comprised in a computer useable medium, which when executed on a computing device, can cause the computing device to determine whether a VM on a first VM hosting server is migrated to a second VM hosting server comprising utilizing a unique identifier of the VM. Further, the computer programming can cause the computing device to determine whether the VM has a data backup relationship with a data store associated with the first VM hosting server, if the migration is detected. Additionally, the computer programming can cause the computing device to utilize the data backup relationship with a data store associated with the first VM hosting server for subsequent backup updates on the second VM hosting server, if the data backup relationship with a data store associated with the first VM hosting server is detected. Also, the computer programming can cause the computing device to utilize conformance testing to mitigate multiple data backups of the VM, the multiple data backups comprising data backups to a data store for both the first and second VM hosting servers.

Figure 8:
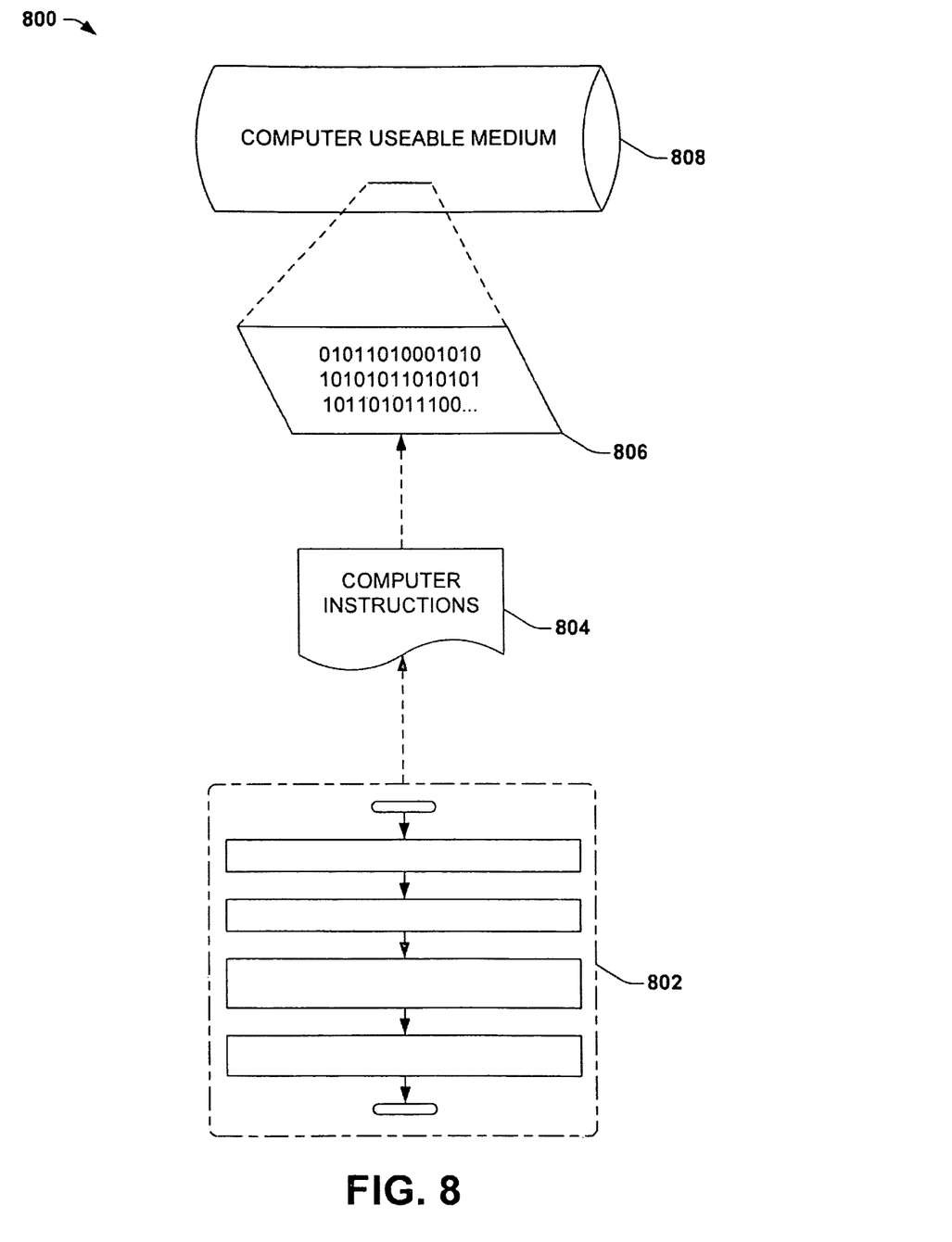
FIG. 8 is an illustration of an exemplary computer-useable medium comprising processor-executable instructions configured to embody one or more of the provisions set forth herein.

An exemplary computer-useable medium that may be devised in these ways is illustrated in FIG. 8, wherein the implementation 800 comprises a computer-useable medium 808 (e.g., a flash-drive, downloadable programming, CD-R, DVD-R, or a platter of a hard disk drive), on which is encoded computer-readable data 806. This computer-readable data 806 in turn comprises a set of computer instructions 804 configured to operate according to one or more of the principles set forth above. In one such embodiment, the processor-executable instructions 804 may be configured to perform the steps described above.

In another such embodiment, the processor-executable instructions 804 may be configured to implement a system, such as the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be appreciated that processes, architectures and/or procedures described herein can be implemented in hardware, firmware and/or software. It will also be appreciated that the provisions set forth herein may apply to any type of special-purpose computer (e.g., file server, filer and/or storage serving appliance) and/or general-purpose computer, including a standalone computer or portion thereof, embodied as or including a storage system. Moreover, the teachings herein can be adapted to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

The operations herein described are exemplary and imply no particular order. Further, the operations can be used in any sequence when appropriate and can be partially used (e.g., not all actions may be necessary). It should be understood that various computer-implemented operations involving data storage may comprise manipulation of physical quantities that may take the form of electrical, magnetic, and/or optical signals capable of being stored, transferred, combined, compared and/or otherwise manipulated, for example.

Computer useable media is intended to comprise any mechanism that can store data, which can be thereafter, be read by a computer system. Examples of computer readable media include hard drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer useable media may also comprise communication media, which typically embodies computer readable instructions or other data in a modulated data signal such as a carrier wave or other transport mechanism (e.g., that has one or more of its characteristics set or changed in such a manner as to encode information in the signal). The computer useable medium can also be distributed (e.g., using a switching fabric, such as used in computer farms) over a network-coupled computer system so that computer readable code is stored and executed in a distributed fashion.

The foregoing description has been directed to particular embodiments. It will be apparent, however, that other variations and modifications may be made to the described embodiments, with the attainment of some or all of their advantages. Specifically, it should be noted that one or more of the principles set forth herein may be implemented in non-distributed file systems. Furthermore, while this description has been written in terms of separate remote and support systems, the teachings are equally suitable to systems where the functionality of the remote and support systems are implemented in a single system. Alternately, the functions of remote and support systems may be distributed among any number of separate systems, wherein respective systems perform one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the spirit and scope of the disclosure herein.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Moreover, the word "exemplary" is used herein to mean serving as an example, instance, or illustration. That is anything described herein as "exemplary" is not necessarily to be construed as advantageous over other aspects or designs. Also, unless specified to the contrary, the term "or" is intended to mean an inclusive "or" rather than an exclusive "or", and the articles "a" and "an" are generally to be construed to comprise "one or more". Furthermore, to the extent that the terms "includes", "having", "has", "with", or variants thereof are used, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

What is claimed is:

1. A method for mitigating rebaselining of a virtual machine (VM), having a data backup relationship with a first VM hosting server and a unique identifier, when migrating the VM from the first VM hosting server to a second VM hosting server, the method comprising:
    determining whether a VM on a first VM hosting server is migrated to a second VM hosting server comprising utilizing a unique identifier of the VM, the determining comprising monitoring one or more directories to determine if a backup agent has associated the unique identifier for the VM with the second VM hosting server, the one or more directories comprising one or more VM hosting locations on VM hosting servers in a server system;
    if the migration is detected, determining whether the VM has a data backup relationship with a data store associated with the first VM hosting server; and
    if the data backup relationship with a data store associated with the first VM hosting server is detected, utilizing the data backup relationship with a data store associated with the first VM hosting server for subsequent backup updates on the second VM hosting server.

2. The method of claim 1, determining whether a VM on a first VM hosting server is migrated to a second VM hosting server comprising a backup manager calling for a new protocol request to list VMs hosted on one or more VM hosting servers in the server system.

3. The method of claim 1, comprising using a storage system manager to monitor and detect a migration of a VM to a second VM hosting server.

4. The method of claim 1, determining whether the VM has a data backup relationship with a data store associated with the first VM hosting server comprising monitoring one or more directories comprising one or more VM backup data store relationships.

5. The method of claim 4, determining whether the VM has a data backup relationship with a data store associated with the first VM hosting server comprising a backup management interface calling for a new protocol request to list VM backup data store relationships.

6. The method of claim 1, utilizing the data backup relationship with a data store associated with the first VM hosting server for subsequent backup updates on the second VM hosting server comprising:
    generating conformance reports for VM data backup relationships; and
    removing one or more subsequent VM backups based upon the conformance reports, the one or more subsequent VM backups comprising at least:
        a backup to one or more locations in the data store associated with previous VM backups when the VM was located on the first VM hosting server; and
        a backup to one or more new locations in the data store associated with VM backups for the second VM hosting server.

7. The method of claim 6, comprising backups transferring merely data blocks that have changed since a last previous backup.

8. The method of claim 1, comprising backups transferring merely data blocks that have changed since a last previous backup.

9. The method of claim 1, comprising removing one or more VM backups based upon one or more conformance errors generated during conformance testing, a conformance error describing more than one data backup relationship for the VM to the data store.

10. The method of claim 9, the more than one backup relationships comprising:
a backup relationship from the first VM hosting server; and
a backup relationship from the second VM hosting server.

11. A system for mitigating rebaselining of a virtual machine (VM) when migrating the VM from a first VM hosting server to a second VM hosting server, comprising:
a first VM hosting server configured to host a VM;
a second VM hosting server configured to host a VM;
a VM comprising a unique identifier;
a data backup component, operably coupled to the first VM hosting server, configured to backup the VM;
a VM migration monitor configured to detect whether the VM is migrated from the first VM hosting server to the second VM hosting server utilizing the unique identifier of the VM;
a VM data backup relationship detector configured to detect a relationship between the VM and the data backup component by monitoring one or more backup directories comprising one or more data store relationships; and
a data backup relationship migration component configured to migrate the data backup relationship to the second VM hosting server.

12. The system of claim 11, the VM migration monitor monitoring one or more VM directories configured to store VM locations on one or more VM hosting servers in a cluster of operably coupled servers.

13. The system of claim 11, the VM data backup relationship detector configured to monitor one or more backup directories configured to store data store relationships to the data backup component in a system of operably coupled servers.

14. The system of claim 13, the data backup relationship migration component configured to update one or more backup directories comprising:
updating the one or more backup directories to associate the VM located on the second VM hosting server with one or more data backup component backup locations associated with the VM when it was located on the first VM hosting server; and
updating the one or more backup directories to disassociate one or more data backup component backup locations from the first VM hosting server that were associated with the VM when it was located on the first VM hosting server.

15. The system of claim 11, comprising a conformance tester configured to determine whether more than one data backup relationship exists for the VM, the more than one data backup relationship comprising:
a backup relationship with the data backup component associated with previous VM backups when the VM was located on the first VM hosting server; and
a backup relationship with the data backup component associated with VM backups for the second VM hosting server.

16. The system of claim 15, the conformance tester configured to generate conformance errors for the VM subsequent to VM migration to the second hosting server, the conformance errors comprising information that more than one data backup relationship exists for the VM.

17. The system of claim 11, comprising a data backup mitigation component configured to perform at least one of:
update the one or more backup directories to associate the VM located on the second VM hosting server with one or more data backup component backup locations associated with the VM when it was located on the first VM hosting server; and
update the one or more backup directories to disassociate one or more data backup component backup locations from the first VM hosting server that were associated with the VM when it was located on the first VM hosting server.

18. A non-transitory computer usable medium comprising computer readable programming configured to mitigate rebaselining of a virtual machine (VM), having a backup relationship with a first VM hosting server and a unique identifier, when migrating the VM from the first VM hosting server to a second VM hosting server which when executed on a computing device causes the computing device to:
determine a list of VMs hosted on one or more VM hosting servers in a server system based upon a backup manager calling for a new protocol request;
determine whether a VM on a first VM hosting server is migrated to a second VM hosting server comprising utilizing a unique identifier of the VM and the list of VMs;
if the migration is detected, determine whether the VM has a data backup relationship with a data store associated with the first VM hosting server; and
if the data backup relationship with a data store associated with the first VM hosting server is detected, utilize the data backup relationship with a data store associated with the first VM hosting server for subsequent backup updates on the second VM hosting server.

* * * * *

UNITED STATES PATENT AND TRADEMARK OFFICE
CERTIFICATE OF CORRECTION

| | | |
|---|---|---|
| PATENT NO. | : 7,917,617 B1 | Page 1 of 1 |
| APPLICATION NO. | : 12/191747 | |
| DATED | : March 29, 2011 | |
| INVENTOR(S) | : Anil Kumar Ponnapur et al. | |

It is certified that error appears in the above-identified patent and that said Letters Patent is hereby corrected as shown below:

Title Page, item [75] Inventors name: replace "Anton Kumar Ponnapur" with
--Anil Kumar Ponnapur--

Signed and Sealed this
Sixteenth Day of August, 2011

David J. Kappos
*Director of the United States Patent and Trademark Office*